United States Patent [19]

Blom

[11] Patent Number: 4,742,937
[45] Date of Patent: May 10, 1988

[54] SEPARATING AND RELEASING DEVICE FOR SINGLE ELEMENTS FOR SINGLE ELEMENTS PARTICULARLY CUPS

[76] Inventor: Erik Blom, Lugnasvagen 2, S-542 00 Mariestad, Sweden

[21] Appl. No.: 827,214

[22] Filed: Feb. 5, 1986

Related U.S. Application Data

[63] Continuation of Ser. No. 578,047, Feb. 7, 1984, abandoned.

[30] Foreign Application Priority Data

Feb. 18, 1983 [AT] Austria ................................ 553/83

[51] Int. Cl.$^4$ .............................................. B65H 3/30
[52] U.S. Cl. .................................. 221/223; 221/271; 221/276; 221/297; 221/299
[58] Field of Search ............... 221/221, 223, 297, 268, 221/276, 271, 264, 232, 299, 59; 222/511, 336, 339; 267/275, 155

[56] References Cited

U.S. PATENT DOCUMENTS

| 1,083,727 | 1/1914 | Claussen | 221/221 |
| 1,260,432 | 3/1918 | Nias | 221/223 X |
| 1,311,170 | 7/1919 | Lockwood et al. | 221/223 |
| 1,666,008 | 4/1928 | Graffenberger | 221/221 |
| 2,077,980 | 4/1937 | Bell | 222/336 X |
| 2,216,064 | 9/1940 | Becker | 221/276 X |
| 3,768,694 | 10/1973 | Miller | 221/221 |

FOREIGN PATENT DOCUMENTS 1429781 6/1970 Fed. Rep. of Germany .

Primary Examiner—Joseph J. Rolla
Assistant Examiner—David H. Bollinger
Attorney, Agent, or Firm—Browdy and Neimark

[57] ABSTRACT

From a pile or stack of cups, which is available in a magazine, the lowermost one is released with the aid of a slide (4) in such a way, that simultaneously retaining elements (7, 16) are slid away from and separating and releasing elements (5) are slid in between the rims (3) of a lowermost cup and the one above it. In such a way, a positive release of a cup (3) is possible. The separating and releasing elements (5) are provided with upper (14) and lower (12) inclined surfaces and their common points are bevelled at (33) away from each other in the direction of feeding or releasing. Due to a bifurcated shape of the slide and provision of same with separating and releasing, elements as well as retaining elements on the inside of the slide shanks or bifurcations one immediately behind the other in sliding direction, great dependability is attained and the separating and releasing device can be manufactured at comparatively low cost, particularly because all essential parts are amde in one piece together with the slide (4). There is no need for provision of parts for retaining a cup pile or for separating and releasing cups at the cup magazine itself.

8 Claims, 4 Drawing Sheets

SEPARATING AND RELEASING DEVICE FOR SINGLE ELEMENTS FOR SINGLE ELEMENTS PARTICULARLY CUPS

This application is a continuation of application Ser. No. 578,047, filed Feb. 7, 1984, now abandoned.

The invention relates to a separating and releasing device for single elements, particularly cups.

A distribution magazine for pliable or stackable drinking cups is known from DE-A No. 1 429 781, in the operation of which a sloping flank on a slide displaces the lowermost drinking cup in such a way that its rim or collar leaves a projection by which it has been supported. At the same time, a retaining surface disappears in a recess in the back wall of the housing, such that the rim or collar no longer can rest there either. The lowermost drinking cup is thus free and is supposed to fall downwards by itself. The sloping flank and a sloping surface are said to assist this falling down. The area of the slide opening beneath an edge is also sloping outwards and assists also in this way the falling of a drinking cup. The slide used in this known distribution magazine on the one hand and the lower part of the magazine on the other hand are provided with a plurality of notches and projections engaging each other, the individual parts themselves being provided with a plurality of inclined and at the same time curved edges, such that the tools for manufacturing of the individual parts are very expensive. At the release of one of the cups, this will be displaced sideways in relation to the pile of cups remaining in the magazine, in which way the individual cups are subjected to a distorsion and may be buckled and damaged.

The slide according to DE A No. 1 429 781 comprises the shape of a fork, but the side or leg portions only provide principally transition portions between both ends of the slide and are entirely without any operating function. In a very disadvantageous way the retaining as well as the separating and releasing means are arranged in the two end regions of the slide and furthermore, some of these functions are carried out by the housing, so that a complicated construction is obtained, which cannot guarantee reliable separation of only one cup at a time and reliable retention of the remaining cups in the pile or stack. The provision of retaining as well as separating and releasing means in the two end areas of the slide means that there is an extremely short travel or stroke length of the slide, which is generally insufficient to perform the required function and requires extremely steep inclined surfaces, as is clearly shown in the drawings of DE-A No. 1 429 781. The angle of the end of the slide is obtuse throughout which can mean that the, in practice very elastic cups, by strong sticking together will only be compressed and will not be separated at all by the obtuse inclined surfaces. Irregularities in the shape of the cups and pile or stack formation may also have the consequence that either no cup separation at all will happen or that more than one cup at a time is released. Furthermore, a considerable tilting of the lowermost cup which is being separated from the pile or stack is necessary, which is not possible when the cups are strongly sticking together, such that no release of a cup will occur. Also it is very disadvantageous that it is only on the return stroke of the slide that a release of a cup is possible.

This kind of operation can imply that the slight movement of the slide indicates a fault, so that a user is not prepared for release of a cup on the return movement, and a released cup, which in some cases may contain a powder, may fall with the result that the cup may fall over and the powder be spilled so that it cannot be used in the intended way. It is an object of the present invention to seek to mitigate these disadvantages.

According to the invention there is provided separating and releasing device for single elements from a pile or stack thereof, particularly cups with a rim, collar, flange or the like projecting from the body of the cups, which device is arranged at the lower end of a magazine for holding the pile or stack, has a slide for separating and releasing single elements, and retaining means and separating and releasing means for said elements, the slide being bifurcated, and the retaining means and separating and releasing means being provided on the slide on the inside of the bifurcations one immediately behind the other as considered in the sliding direction.

Using the invention it is possible to provide that the separating and releasing device is assembled from relatively much fewer parts than hitherto, is reliable in operation and handles the objects to be separated and released in a gentle way. Because of the simple design it is possible to manufacture it in a relatively priced advantageous tool, for instance such as a transfer mould.

There may be a true fork shape of the slide in other words the fork legs, are in use actively operable to separate a cup which above all has the considerable advantage that the retaining and also the separating and releasing means may perform a considerably bigger travel—or stroke movement than the width of the protruding rims, collars or the like of the cups. In doing this it is possible to operate using small acute angles throughout, which provide a a smooth and a safe retaining and separating action.

Because the housing at least at the time of separation is completely free from protrusions and similar holding means and the holding means as well as the separating and releasing means are arranged exclusively on the slide, namely on the inside of the legs thereof immediately behind each other, a safe retention of the pile of cups and the lowermost cup until its removal, and also a safe and expedient removal is provided. The said means on the sidewalls pass by the two lowermost cups so that practically unlimited travel—or stroke lengths can be achieved or in any event adequate ones can be used, which stroke length is usually several times the width of the protruding rims of the cups.

Because the retaining means and the separating and releasing means are arranged immediately behind one other a tilted pile or stack of cups can have no influence on the retaining and releasing action at all, since the retaining and the releasing means are situated so close to each other and mutually directly supersede each other. In this way there is no need for a tilting of the cups to occur but the lowermost cup will be separated by an essentially downwards directed force.

The retaining means as well as the separating and releasing means may be arranged one behind the other in the sliding direction of the slide. This provides for increasing the dependability of operation because each time an enforced separation of the lowermost cup occurs straight after that its removal from the pile or stack of cups is achieved. At the same time as this separation occurs, the pile or stack of cups is held by the separating and releasing means, which also temporarily takes the place of the retaining means.

The separating and releasing means may be provided with inclined surfaces, which may face the upper surface of the rim collar, flange or similar of the lowermost cup. In this way a particularly gentle release of the lowermost cup is possible.

Each separating and releasing means may be provided with an inclined surface, which faces the underside of the rim of that cup which is situated above the lowermost cup. This provides that the separating and releasing means cannot damage that cup which is situated over the lowermost cup during the separating and releasing procedure. At the same time the separating and releasing means can also enter into relatively narrow interspaces between the rims or the like of adjacent cups. Furthermore, the pile or stack of cups is raised on removal, so that the separation of the lowermost cup can be performed even more safely.

Moreover, on the return of the slide an especially genle lowering of the pile or stack of cups remaining in the magazine is guaranteed, which consequently also has a shorter distance to fall to the retaining means. Moreover, the initial lifting and the subsequent lowering of the pile or stack of cups provides to a large extent that the pile or stack cannot get stuck in the magazine.

The retaining means may taper off in a direction which is opposite to the feeding direction of the slide. This provides the purpose of adapting the shape of the retaining means to the shape of the cups, when it is shifted forwards during the separating and releasing procedure, such that the released, lowermost cup can leave the magazine without any hindrance.

The slide, the separating and releasing means and the retaining means may be made in one piece. In this way a particularly costadvantageous manufacure of the slide with its separating and releasing means as well as its retaining means is possible.

Embodiments of the invention are hereinafter described, with reference to the accompanying drawings.

Figure 1:
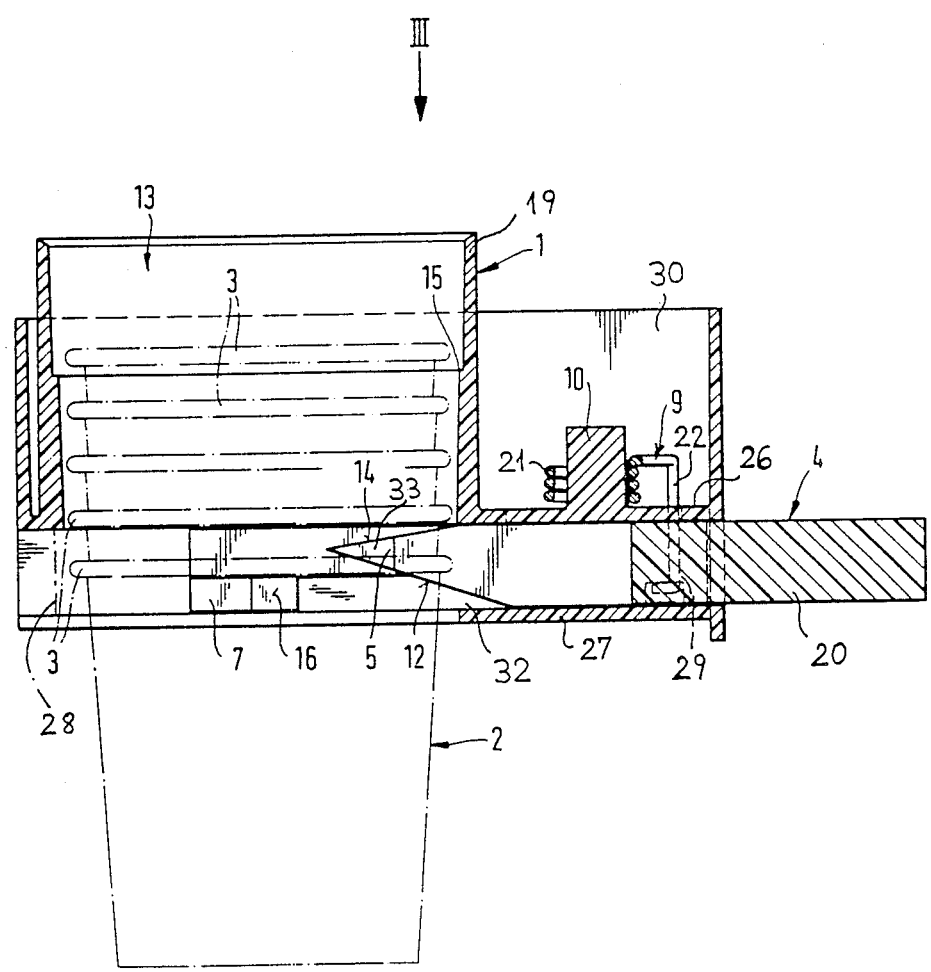
FIG. 1 is a section through a separating and releasing device for single elements according to the invention along the line I—I in FIG. 3.

Referring to the drawings, a magazine 1 (FIG. 1), is provided for a pile or stack of cups 2, for instance drinking cups. The individual cups 2 have in a known way a projecting rim, collar, flange or similar 3. The lowermost cup 2 of the pile rests on retaining means 7, 8 (FIG. 1, 3) with its rim 3, while the pile is guided by an upwards projecting connector 19 of the magazine. If a very high pile is used, it is beneficial to provide a ledge 15 in the connector 19, such that a connecting guide pipe (not shown) can be introduced in the connector down to the ledge 15.

The retaining means 7, 8 constitute parts of a slide member 4, which can be displaced in the direction of an arrow 11 (FIG. 2) against the tension of a spring, in the embodiment shown a spring 9 (FIG. 3) fastened on a stud 10. The stud 10 protrudes from the upper magazine surface 26 from a protruding magazine slide handle 20 and carries a wound, especially screw-shaped part 21 of the spring 9, from which part shanks 22, 23 protrude sideways and extend with their downwardly bent ends through guiding slots 24, 25, which are arranged in the sliding direction of the slide in the upper magazine surface 26. The shank ends are anchored in a third portion of the slide 4, for instance in holes 29, and said slide is guided between the upper magazine surface 26 and a lower magazine surface 27 as well as side walls 30, 31, the slide being insertable with the handle first in slide opening 32, which is open at the side of the magazine opposite to the slide handle. The spring 9 brings the slide 4 after its insertion back into its protruding rest position as shown in FIGS. 1 and 3. On the slide 4 is also provided separating and releasing means 5, 6 (FIGS. 1, 3). The separating and releasing means 5, 6 are provided with upper and lower inclined surfaces 14 and 12. The retaining means 7, 8 have lateral, away from each other directed, inclined surfaces 16, 17. The inclined surfaces 12 and 14 from an angle of 10°-60°, preferably approximately 30°, and 2°-45°, respectively preferably approximately 15°, with the surface of the slide.

Figure 2:
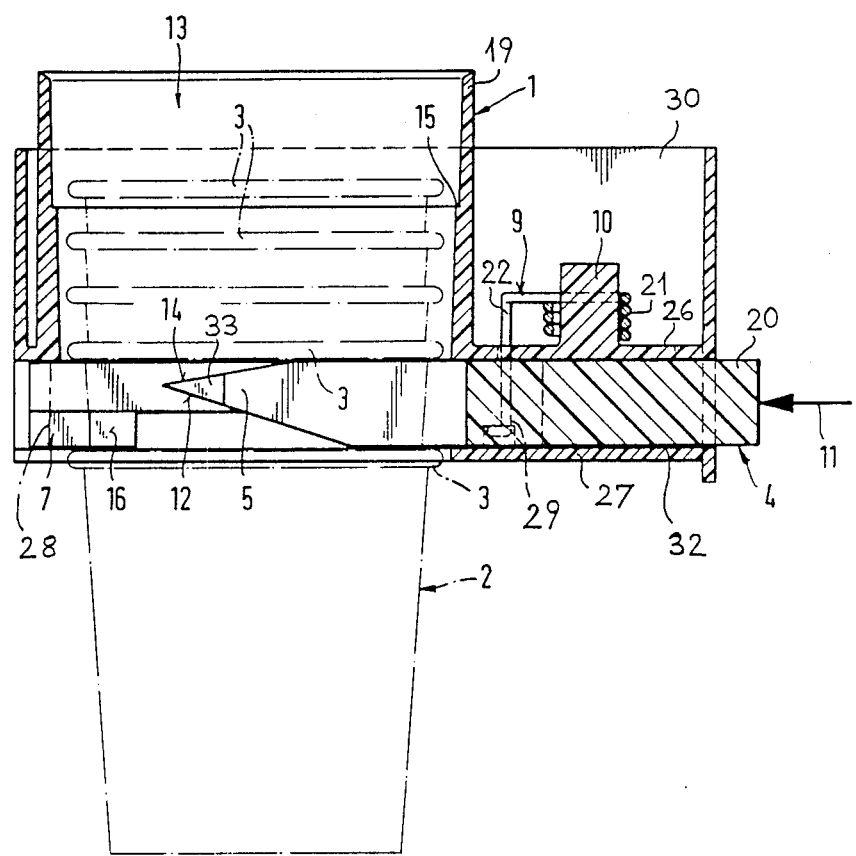
FIG. 2 is a sectionalised view similar to the one in FIG. 1, although with an actuated slide member drawn backwards in connection with a separating and releasing operation which has just finished.
Figure 3:
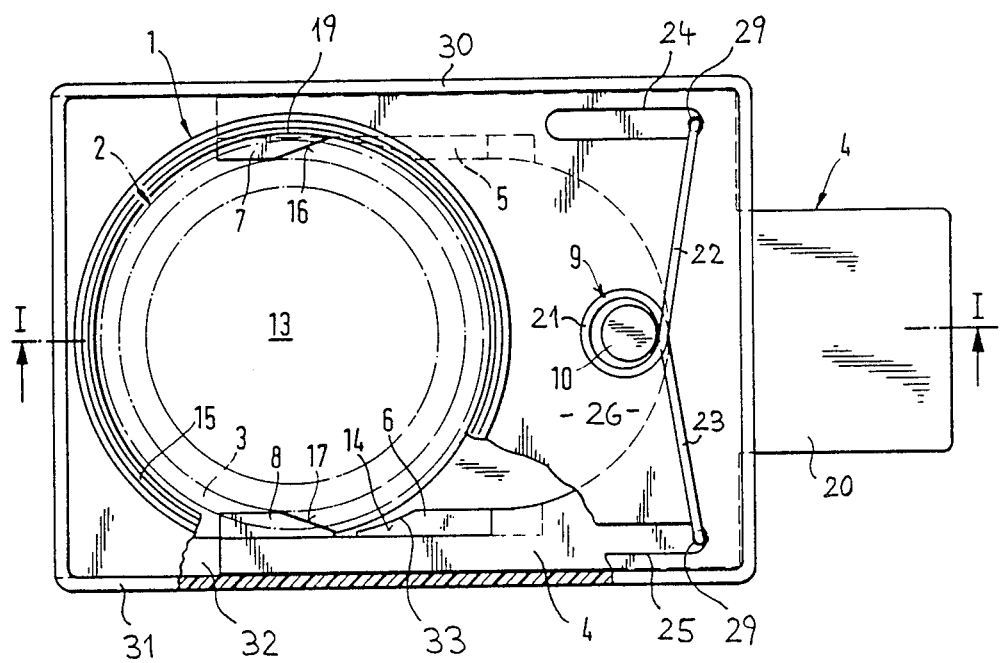
FIG. 3 is a plan view, partially in section, of a separating and releasing device for single elements according to the invention.
Figure 4:
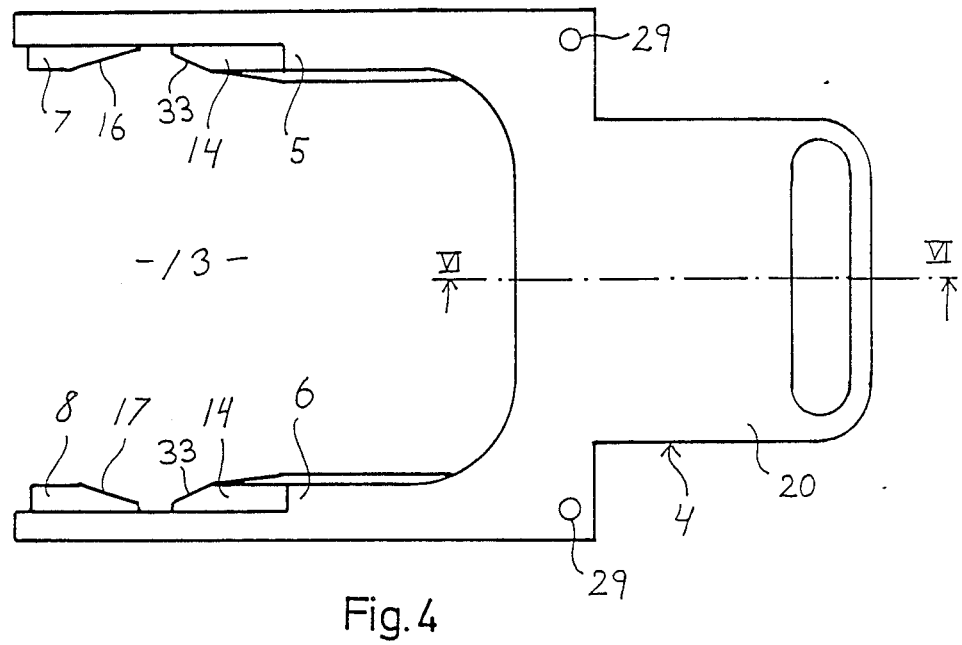
FIG. 4 is a plan view of a somewhat modified slide according to the invention.
Figure 5:
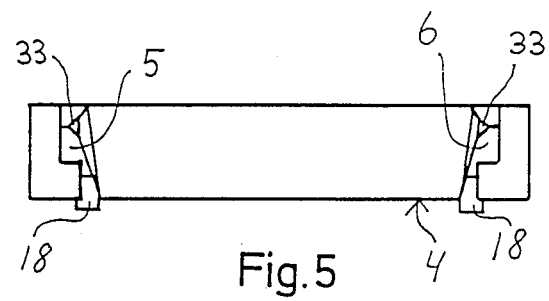
FIG. 5 is a front view from the left of FIG. 4.
Figure 6:
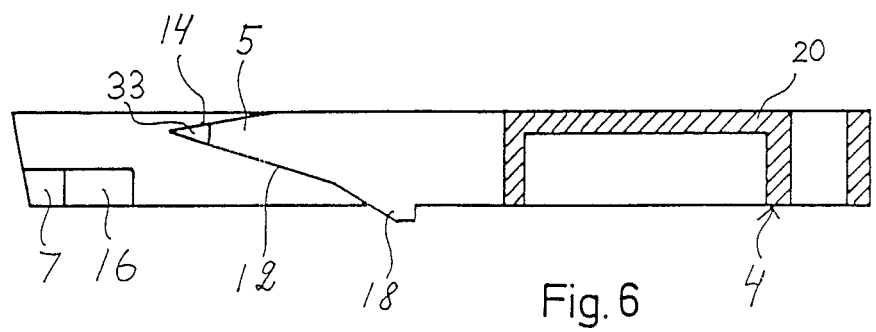
FIG. 6 is a longitudinal sectionalised view along the line VI—VI in FIG. 4.

If a cup 2 (FIGS. 1, 3) is to be removed from the pile or stack through an opening 13, then the slide member 4 is displaced in the direction of the arrow 11 (FIG. 2). The separating and releasing means 5, 6 enter with their inclined surfaces 12, 14 between the rims 3 of the lowermost cup and the cup above it, which is further facilitated by the fact, that ends or points of the means 5, 6 are bevelled in directions away from each other as at 33. At the same time the retaining means 7, 8 move in the direction of the arrow 11 and release in the fully inserted position of the slide the rim 3 of the lowermost cup 2, such that this can fall freely downwardly. When the cups are very slightly conical and/or provided with a profile a relatively long, vertical separation movement may be necessary. In consideration of this fact, there may be provided at the lowermost end of the inclined surface 12 a further downwards angled, beyond the lower slide surface, protruding protrusion 18 (FIGS. 4–6), which consequently acts during the end phase of the separation to remove a cup.

At the return movement of the slide member 4 in the opposite direction to that shown by the arrow 11 (FIG. 2) the now lowermost cup of the pile or stack will slide downwards over the inclined surfaces 14 to the upper side of the separating and retaining means 5, 6 and will come to rest on the upper limiting surfaces of the retaining means 7, 8. Now another cup can be removed in the described manner from the pile or stack.

The inclined surfaces 16, 17 of the retaining means 7, 8 are adapted to the outer contours of the rims of the cups and allow each time the lowermost cup which is to be removed through the opening 13, to slide out, provided that the slide 4 is positioned in its fully inserted position (FIG. 2).

The slide 4 may be operated by hand. It must in this case according to the described embodiment just be pushed inwards in the direction of the arrow 11 (FIG. 2), and when it is released it will automatically slide to its initial position (FIG. 1).

It is also possible to install the spring 9 in such a way, that the slide 4 has its rest position at its innermost position (FIG. 2), and that it when used, i.e. when a cup 2 is removed, must be pulled out in the counter-direction of the arrow 11.

The operation of the slide 4 may also be performed in an electromotive, electromagnetic or any other suitable way.

The retaining means 7, 8 and the separating and releasing means 5, 6 comprise together with the slide 4 in the described embodiment a one-piece part. In this way an especially price-advantageous production of the sldie with its separating and releasing means 5, 6 and its retaining means 7, 8 is possible. The separating and releasing device for single elements described is particularly dependable, since when operating the slide 4, the retaining means 7, 8 as well as the separating and releasing means 5, 6 are automatically moved into the required position.

Suitably a concentric catchment pipe (not shown) or similar is connected to the connector 19 at its lower (as viewed) end. At the lower end of this catchment pipe, which for instance is provided with an inside flange, a released cup is caught and can be removed sideways through an opening in the catchment pipe. This pipe or the like or the connector or some other part extends into the area in front of and inside of the slide opening for providing stop surfaces 28, which are only schematically shown at one place in FIG. 1, and which make impossible even in exceptional cases a horizontal displacement in the feeding or opposite direction of a cup to be separated and released. The shanks of the slide do slide through or along the surfaces 28. The stop surfaces 28 can be interrupted, for instance as minor remaining parts of the pipe, connector or the like.

I claim:

1. A device for separating and releasing single elements from a pile or stack thereof, particularly cups with a rim, collar, flange or the like projecting from the body of the cups, said device comprising:

a slide member including a first bifurcated portion, a second operating handle portion, and a third portion separating said bifurcated portion from said handle portion, said bifurcated portion comprising opposing arms each having a retaining means and a separating and releasing means, for said elements, said retaining means and said separating and releasing means being disposed on the side of said arms facing each other in substantially horizontal alignment, said separating and releasing means further including an upper side, a lower side, and protrusions extending downwardly from the lower side below the lower plane of the remainder of said slide member, said separating and releasing means lower side facing the upper side of the rim or the like of the lowermost element of said pile or stack and being inclined at a first angle of 10°–60° relative to said lower plane, and said separating and releasing means upper side facing the lower side of the rim or the like of the element above said lowermost element and being inclined relative to said lower plane at a second angle, which is smaller than said first angle, of 2°–45°, spring means, and a magazine having an upper surface and a lower surface spaced below said upper surface, said magazine including a first cylindrically shaped portion, having a vertical extent, for holding the pile or stack of said elements, and a second portion surrounding said first portion and including said upper and lower surfaces, said surfaces defining therebetween means for supporting said slide member for sliding movement in a plane below said first portion and in a direction normal to said vertical extent, between a first element supporting position and a second position wherein the lowermost element in the pile or stack is separated and released therefrom, said magazine second portion including an upstanding boss about which said spring means is secured, said spring means including ends engaged in said slide member at one side of said boss for normally biasing said slide member to said element supporting position, said spring ends being positionable on the opposite side of said boss when said side member slides to said second position.

2. The device of claim 1, wherein the angle of inclination of the lower side of the separating and releasing means is approximately 30°.

3. The device of claim 1, wherein the angle of inclination of the upper side of the separating and releasing means is approximately 15°.

4. The device of claim 1, in which the foremost ends of the separating and releasing means, in relation to the feeding movement of the slide, are divergent.

5. The device of claim 4, wherein said retaining means are diverging in a horizontal plane and in a direction opposite to the feeding movement of the slide.

6. The device of claim 1, wherein the slide, the separating and releasing means and the retaining means are made in one piece.

7. The device of claim 1, wherein the slide member is slidably arranged in an opening between side walls of said second portion and is insertable into such opening handle first, said opening terminating freely at the side of the housing opposite the handle.

8. The device as set forth in claim 1 wherein said spring means is disposed entirely within said second portion, said second portion being accessible from above so that said spring means can be adjusted.

* * * * *